US012136090B2

(12) United States Patent
Matsutani et al.

(10) Patent No.: US 12,136,090 B2
(45) Date of Patent: Nov. 5, 2024

(54) INFORMATION PROCESSING SYSTEM, SERVER, AND COMPUTER READABLE RECORDING MEDIUM

(71) Applicant: TOYOTA JIDOSHA KABUSHIKI KAISHA, Toyota (JP)

(72) Inventors: Shintaro Matsutani, Kariya (JP); Misato Yokota, Tokyo (JP); Yumiko Osaki, Tokyo (JP); Atsushi Yoneki, Chigasaki (JP); Kazunari Tsutsumi, Tokyo (JP); Mitsunori Isoda, Tokyo (JP); Yuzo Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 17/227,487

(22) Filed: Apr. 12, 2021

(65) Prior Publication Data
US 2021/0350367 A1    Nov. 11, 2021

(30) Foreign Application Priority Data

May 7, 2020   (JP) .................................. 2020-082208

(51) Int. Cl.
*G06Q 20/40* (2012.01)
*G06Q 20/36* (2012.01)

(52) U.S. Cl.
CPC .......... *G06Q 20/401* (2013.01); *G06Q 20/36* (2013.01); *G06Q 20/405* (2013.01)

(58) Field of Classification Search
CPC ........................................... G06Q 20/00–425
See application file for complete search history.

(56) References Cited

U.S. PATENT DOCUMENTS 8,127,982 B1 *  3/2012  Casey ................... G06Q 40/02
                                              235/382.5
8,543,458 B1 *  9/2013  Broadhead .............. H04L 67/01
                                              705/14.54
(Continued)

FOREIGN PATENT DOCUMENTS

JP       2003-337916 A       11/2003
JP       2003337916 A   *   11/2003
(Continued)

*Primary Examiner* — Chenyuh Kuo
(74) *Attorney, Agent, or Firm* — Oliff PLC

(57) ABSTRACT

An information processing systems includes: a first terminal including a first processor including hardware; a second terminal including a second processor including hardware; and a server including a third processor including hardware, and a storage device, wherein the first processor is configured to transmit, to the server, information regarding payment processing using electronic money deposited into an electronic wallet, the third processor is configured to transmit, when receiving the information regarding the payment processing, an approval request for the payment processing to the second terminal associated with an approver for a user of the electronic wallet, and perform the payment processing when receiving information indicating approval for the approval request from the second terminal, and the second processor is configured to transmit, when the information indicating approval is input for the approval request received from the server, the information to the server.

7 Claims, 8 Drawing Sheets

(56) References Cited

U.S. PATENT DOCUMENTS

| | | | |
|---|---|---|---|
| 10,699,275 B2* | 6/2020 | Allen | G06Q 20/102 |
| 11,295,313 B1* | 4/2022 | Russell | G06Q 20/387 |
| 2004/0006536 A1* | 1/2004 | Kawashima | G06Q 20/28 |
| | | | 705/40 |
| 2012/0209749 A1* | 8/2012 | Hammad | G06Q 20/326 |
| | | | 705/27.1 |
| 2015/0348032 A1* | 12/2015 | Ioveva | G06Q 20/2295 |
| | | | 705/44 |
| 2016/0292675 A1* | 10/2016 | Akashika | G06Q 20/3829 |
| 2018/0349909 A1 | 12/2018 | Allen et al. | |
| 2019/0066089 A1* | 2/2019 | Miryala | G06Q 20/367 |
| 2019/0197527 A1* | 6/2019 | Agarwalla | G06Q 20/3676 |

FOREIGN PATENT DOCUMENTS

| | | |
|---|---|---|
| JP | 2006-293500 A | 10/2006 |
| JP | 2015-111351 A | 6/2015 |

\* cited by examiner

FIG.3

| USER ID | USER NAME | CLASSIFI-CATION | APPROVER ID | APPROVER NAME |
|---|---|---|---|---|
| 0001 | A | USER | 0002 | B |
| 0002 | B | APPROVER | - | - |
| 0003 | C | USER | 0004 | D |
|  |  |  | 0005 | E |
| 0004 | D | APPROVER | - | - |
| 0005 | E | APPROVER | - | - |

FIG.4

| DATE | STORE NAME | PRODUCT NAME | APPROVER ID | APPLICATION RESULT | TRANS-ACTION AMOUNT | BALANCE |
|---|---|---|---|---|---|---|
| 3/10/2020 | X STORE | aaa | 0002 | APPROVE | 3000 YEN | 2000 YEN |
|  |  | bbb |  |  |  |  |
|  |  | ccc |  |  |  |  |
| 3/10/2020 | X STORE | aaa | 0002 | REJECT | - | 2000 YEN |

FIG.5

| DATE | STORE NAME | PRODUCT NAME | APPROVER ID | APPLICATION RESULT | TRANS-ACTION AMOUNT | BALANCE |
|---|---|---|---|---|---|---|
| 3/17/2020 | Y STORE | ddd | 0004 | APPROVE | 1000 YEN | 5000 YEN |
|  |  |  | 0005 | APPROVE |  |  |
| 3/18/2020 | Y STORE | eee | 0004 | - | 500 YEN | 4500 YEN |
|  |  |  | 0005 | APPROVE |  |  |
| 3/18/2020 | Y STORE | eee | 0004 | - | - | 4500 YEN |
|  |  |  | 0005 | REJECT |  |  |

INFORMATION PROCESSING SYSTEM, SERVER, AND COMPUTER READABLE RECORDING MEDIUM

The present application claims priority to and incorporates by reference the entire contents of Japanese Patent Application No. 2020-082208 filed in Japan on May 7, 2020.

BACKGROUND

The present disclosure relates to an information processing system, a server, and a computer readable recording medium.

JP 2015-111351 A discloses an information processing system that performs electronic settlement by electronic money, in which restriction on depositing into electronic money, an upper limit of a settlement amount in one transaction, and an upper limit of a cumulative settlement amount are provided.

SUMMARY

According to the configuration disclosed in JP 2015-111351 A, a user may not use electronic money when a preset use restriction of electronic money is applied under a situation in which the user intends to make payment by electronic money.

There is a need for an information processing system, a server, and a computer readable recording medium that enable even a user whose use of electronic money is restricted to make payment using electronic money.

According to one aspect of the present disclosure, there is provided an information processing systems including: a first terminal including a first processor including hardware; a second terminal including a second processor including hardware; and a server including a third processor including hardware, and a storage device, wherein the first processor is configured to transmit, to the server, information regarding payment processing using electronic money deposited into an electronic wallet, the third processor is configured to transmit, when receiving the information regarding the payment processing, an approval request for the payment processing to the second terminal associated with an approver for a user of the electronic wallet, and perform the payment processing when receiving information indicating approval for the approval request from the second terminal, and the second processor is configured to transmit, when the information indicating approval is input for the approval request received from the server, the information to the server.

BRIEF DESCRIPTION OF THE DRAWINGS

FIG. 3 is a diagram illustrating an example of a data table of user information;

FIG. 4 is a diagram illustrating an example of a data table of wallet information;

FIG. 5 is a diagram illustrating another example of the data table of the wallet information;

DETAILED DESCRIPTION

Hereinafter, an information processing system, a server, and a computer readable recording medium storing a program in embodiments of the present disclosure will be specifically described with reference to the drawings. Note that the present disclosure is not limited to the embodiments described below.

Figure 1:
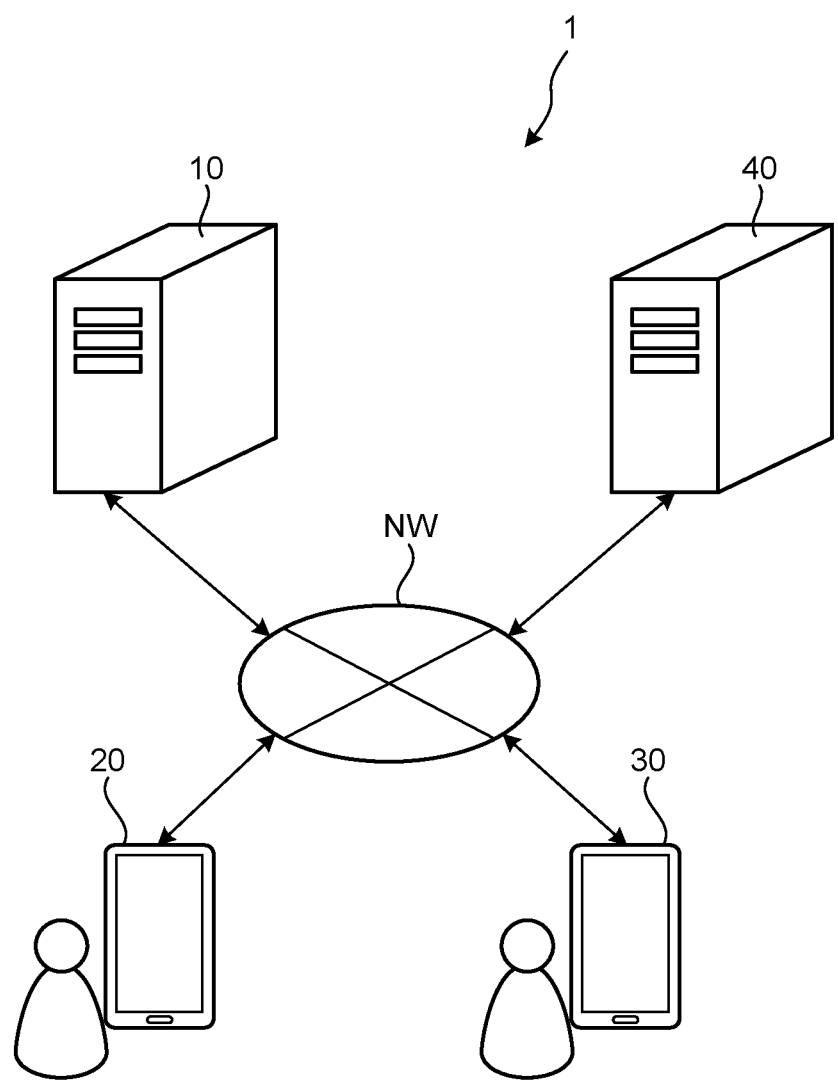
FIG. 1 is a schematic diagram illustrating a schematic configuration of an information processing system in a first embodiment.
Figure 2:
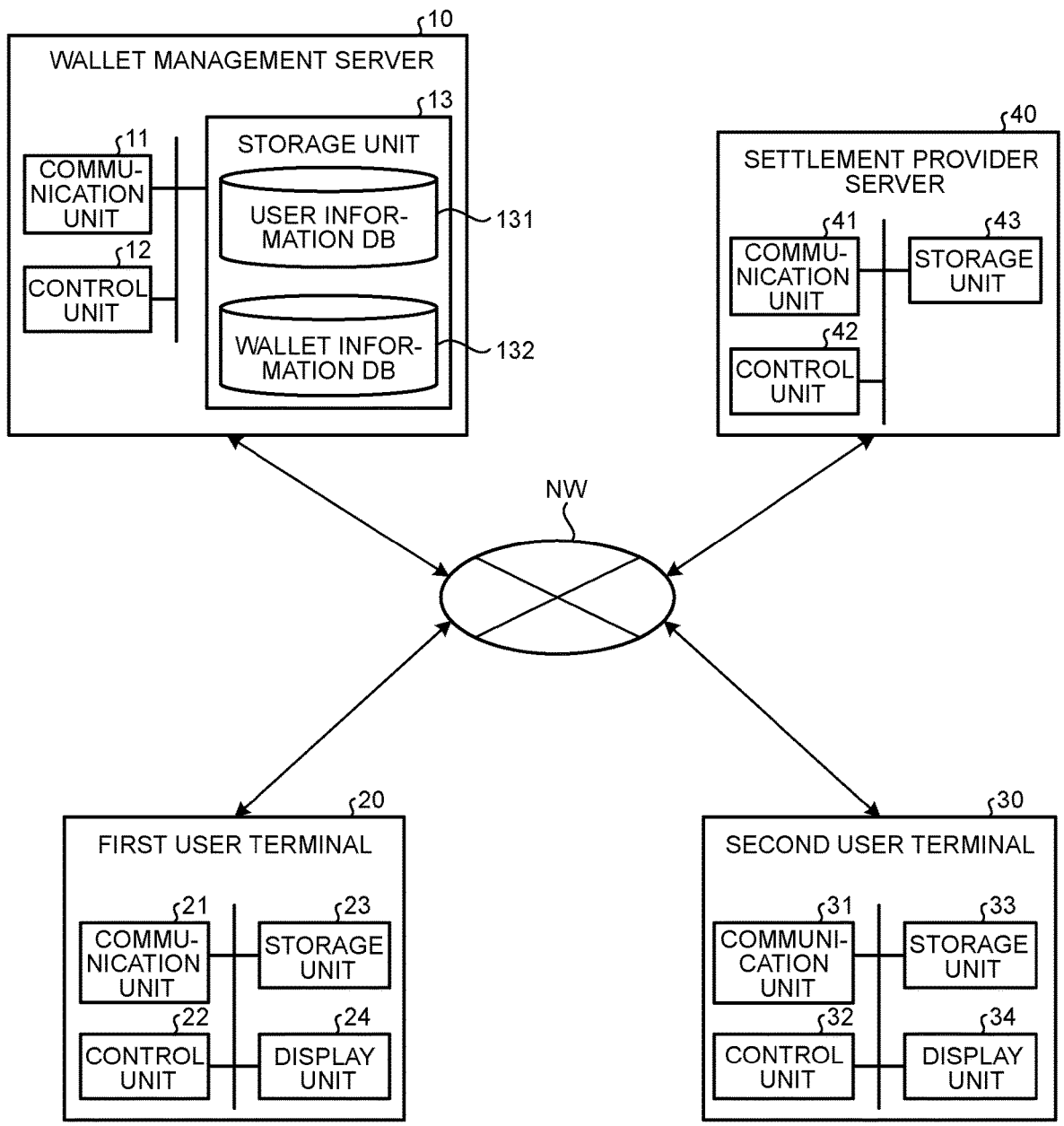
FIG. 2 is a block diagram illustrating functional blocks of the information processing system in the first embodiment.

A configuration of an information processing system in a first embodiment will be described with reference to FIGS. 1 and 2. As illustrated in FIG. 1, an information processing system 1 of the first embodiment includes a wallet management server 10, a first user terminal 20, a second user terminal 30, and a settlement provider server 40.

In the information processing system 1, the wallet management server 10, the first user terminal 20, the second user terminal 30, and the settlement provider server 40 may communicate with each other through a network NW. The network NW includes, for example, an internet line network and a mobile phone line network.

When a user who is a first user makes payment by electronic money by using the first user terminal 20, the information processing system 1 obtains approval for the payment processing from an approver who is a second user in real time through the second user terminal 30. As illustrated in FIG. 1, the first user terminal 20 is a user terminal used by the user, and the second user terminal 30 is an approver terminal used by the approver.

The wallet management server 10 is a server for comprehensively managing a wallet system, and is managed by an administrator of the wallet system. As illustrated in FIG. 2, the wallet management server 10 includes a communication unit 11, a control unit 12, and a storage unit 13.

The communication unit 11 includes, for example, a local area network (LAN) interface board and a wireless communication circuit for wireless communication. The communication unit 11 is connected to the network NW such as the Internet serving as a public communication network. In addition, the communication unit 11 communicates with the first user terminal 20, the second user terminal 30, and the settlement provider server 40 by connecting to the network NW.

The control unit 12 includes a processor and a memory. The processor includes a central processing unit (CPU), a digital signal processor (DSP), and a field-programmable gate array (FPGA). The memory is a main storage device, and includes a random access memory (RAM) and a read only memory (ROM). The control unit 12 loads a program stored in the storage unit 13 into a work area of the memory (main storage device), executes the program, and controls each component and the like through the execution of the program, thereby implementing a function matching a predetermined purpose. In the first embodiment, the processor included in the control unit 12 corresponds to a third processor.

The storage unit 13 includes a recording medium such as an erasable programmable ROM (EPROM), a hard disk drive (HDD), and a removable medium. Examples of the removable medium include a disc recording medium such as a universal serial bus (USB) memory, a compact disc (CD), a digital versatile disc (DVD), and a Blu-ray (registered trademark) disc (BD). The storage unit 13 may store an operating system (OS), various programs, various tables, various databases (DBs), and the like. The storage unit 13 includes a user information database 131 and a wallet information database 132.

The user information database 131 stores information regarding a user who uses the information processing system (hereinafter, referred to as "user information"). Examples of the user information include a user ID of the user who has registered to use the wallet system, a password, a name of the user (user name), contact information (for example, address, phone number, and email address) of the user, a use registration history, information regarding a payment method registered as a depositing method, information regarding a payment method registered as a settlement method, a personal identification number at the time of settlement, classification, presence or absence of an approver, and presence or absence of a use restriction. Note that, in the user information, the user ID and the password are used for authentication processing such as login to the wallet management server 10.

In addition, the user information database 131 stores information indicating that the user is restricted in use of deposit into and withdrawal from an electronic wallet (hereinafter referred to as "use restriction information"). The electronic wallet indicates a virtual deposit/withdrawal account of electronic money. The use restriction information is stored in a restricted person table of the user information database 131.

As illustrated in FIG. 3, the restricted person table includes information such as a user ID, a user name, classification, an approver ID, and an approver name. A record of a user ID "0001" includes information indicating that a user with a user name "A" is classified as a "user" and a user with an approver name "B" with an approver ID "0002" is registered as an approver. That is, a user with a user name "B" is registered as an approver for the user name "A". As a combination of a user and an approver, there is a case where the user is a child and the approver is a parent. As another combination, there is a case where a user is an elderly person and an approver is a son or a daughter of the elderly person. Furthermore, there is a case where a user and an approver live in remote places. In addition, a record of a user ID "0002" includes information indicating that the user with the user name "B" is classified as an "approver" and fields for the approver ID and the approver name are blank. The fact that both the fields for the approver ID and the approver name are blank means that no approver is set for the user.

It is also possible to set a plurality of approvers for one user. As illustrated in FIG. 3, for a user with a user ID "0003" and a user name "C", two users with a user name "D" and a user name "E" are registered as approvers. In a case where a plurality of approvers is registered, approval from each approver will be requested. In this case, the approver with the user name "D" is a first approver and owns a second user terminal 30 as a first approver terminal. The approver with the user name "E" is a second approver and owns a second user terminal 30 as a second approver terminal. Note that, in this description, a user for whom an approver is set in the restricted person table may be described as a "user".

The wallet information database 132 stores information regarding the electronic wallet of the information processing system 1 (hereinafter, referred to as "wallet information"). Examples of the wallet information include a user ID, a balance of electronic money, a deposit history of electronic money, and a use history of electronic money.

In addition, the wallet information database 132 stores information regarding settlement of the wallet system (hereinafter, referred to as "settlement information"). Examples of the settlement information include a user ID, a settlement method used for settlement (for example, electronic money payment, scan payment, and code payment), and settlement history. Note that electronic money payment is contactless settlement.

Furthermore, the wallet information database 132 stores information indicating an application history and a payment history of the user (hereinafter, referred to as "history information"). The history information is stored in a history table of the wallet information database 132.

As illustrated in FIGS. 4 and 5, the history table includes information such as a date of application, a store name, a product name, an approver ID, an application result, a transaction amount, and a balance. FIG. 4 illustrates a history table indicating history information regarding the user name "A". FIG. 5 illustrates a history table indicating history information regarding the user name "C".

An example illustrated in FIG. 4 is history information in a case where, when the user with the user name "A" purchased products with product names "aaa", "bbb", and "ccc" at a store with a store name "X store" on a date "3/10/2020", as a result of an application to the approver, an application result was "approve". The history information indicates that payment processing of a transaction amount "3000 yen" was performed and a balance of electronic money after the transaction became "2000 yen". In addition, FIG. 4 illustrates history information in a case where, when the user with the user name "A" tried to purchase again the same product with the product name "aaa" at the same store with the store name "X store" on the same date "3/10/2020", as a result of an application to the approver, the application result was "reject". The history information indicates that payment using the electronic wallet was not possible.

An example illustrated in FIG. 5 is history information in a case where, when the user with the user name "C" purchased a product with a product name "ddd" at a store with a store name "Y store" on a date "3/17/2020", as a result of an application to the plurality of approvers, all approvers approved the application. The history information indicates that a balance of electronic money became "5000 yen" after transaction of a transaction amount "1000 yen". In addition, FIG. 5 illustrates history information in a case where, when the user with the user name "C" purchased a product with a product name "eee" at the store with the store name "Y store" on a date "3/18/2020", as a result of an application to the plurality of approvers, only one approver approved the application. The history information indicates that a balance of electronic money became "4500 yen" after transaction of a transaction amount "500 yen". Furthermore, FIG. 5 illustrates history information in a case where, when the user with the user name "C" tried to purchase again the same product with the product name "eee" at the same store with the store name "Y store" on the same date "3/18/2020", as a result of an application to the plurality of approvers, only one approver responded, and the response was "reject". In this case, the application is rejected. When the application is rejected, payment processing using electronic money is not performed.

For example, in a case where a plurality of approvers is registered for one user, it may not be possible to obtain responses to the application from all approvers. In this case, if even one approver responds that the application is approved, the payment processing is permitted. That is, in a case where both approval and rejection are included in the obtained response, the approval takes precedence. In other words, in a case where no approval response is obtained from any approver, the application is rejected and the payment processing is stopped. As a specific example, there is a case where, when an application is made to a plurality of approvers, responses are obtained from all the approvers and all the responses are rejection. Alternatively, there is a case where not all the approvers responded, but all the responses obtained are rejection. In addition, a response deadline for an approval request is set in advance. Then, the wallet management server 10 determines "approve" and "reject" for the responses received within the response deadline. Furthermore, in a case where no response is received from any approver within the response deadline, the wallet management server 10 regards the application as rejected. In the case where no response is received within the deadline, the field for the application result in the history table is blank.

The first user terminal 20 is a computer terminal used by a user who is a first user. Examples of the first user terminal 20 include a smartphone, a mobile phone, a tablet terminal, a wearable computer, and a personal computer, which are used by the first user. In the first embodiment, the first user terminal 20 corresponds to a first terminal.

The first user terminal 20 includes a communication unit 21, a control unit 22, a storage unit 23, and a display unit 24. The communication unit 21, the control unit 22, and the storage unit 23 included in the first user terminal 20 are physically similar to the communication unit 11, the control unit 12, and the storage unit 13 included in the wallet management server 10. The first user terminal 20 may be any terminal as long as it is a mobile terminal capable of transmitting and receiving information to and from the wallet management server 10 via the network NW.

The control unit 22 functions as a display control unit, a depositing method registration unit, a settlement method registration unit, a depositing processing unit, and a settlement processing unit through execution of a program stored in the storage unit 23. In the first embodiment, a processor included in the control unit 22 corresponds to a first processor.

When functioning as the display control unit, the control unit 22 controls display contents on the display unit 24. Based on operation of the first user (touch operation, flick operation, and the like), the control unit 22 displays various screens on the display unit 24. Examples of the screens to be displayed include a login screen for logging in to the wallet system, a settlement screen when settlement is performed by scan payment or the like, a use history screen showing a list of use histories of settlement and the like, a payment history detail screen showing details of a payment history, and a depositing screen when electronic money is deposited into the electronic wallet. Furthermore, the control unit 22 performs transition of each screen based on operation of the first user.

In addition, when functioning as the depositing method registration unit, the control unit 22 registers a depositing method for depositing electronic money. The depositing method refers to a method for depositing electronic money into the electronic wallet serving as a virtual deposit/withdrawal account. Examples of the depositing method include a bank account and a credit card among payment methods. By registration of the bank account and the credit card as the depositing methods, it becomes possible to deposit electronic money into the electronic wallet. In addition, the payment method refers to a method that serves as funds for payment when settlement is performed. Examples of the payment method include a bank account, a credit card, and a balance of electronic money in the electronic wallet. A bank account is associated with each credit card, and a use amount of each card is withdrawn from the bank account at a later date.

The control unit 22 transmits, to the wallet management server 10, a depositing method registration request for registering a plurality of different payment methods operated by a plurality of companies as depositing methods to the electronic wallet. When receiving the depositing method registration request from the first user terminal 20, the control unit 12 of the wallet management server 10 stores, as the user information, the payment methods included in the depositing method registration request in the user information database 131 of the storage unit 13. Thus, the payment methods are registered as the depositing methods in the user information database 131.

In addition, when functioning as the settlement method registration unit, the control unit 22 registers the payment method to be registered as the depositing method also as a settlement method. The settlement method refers to a method of performing settlement by using the payment method. The settlement method includes scan payment. The scan payment is settlement performed by reading a barcode or QR code (registered trademark) displayed in a store with a camera or the like of the first user terminal 20. Note that, in the scan payment, a barcode or QR code (registered trademark) displayed on a store terminal such as a cash register may be read by the first user terminal 20.

In addition, when functioning as the depositing processing unit, the control unit 22 deposits electronic money into the electronic wallet. The control unit 22 transmits, to the wallet management server 10, a depositing request for depositing electronic money into the electronic wallet by the payment method registered as the depositing method. When receiving the depositing request from the first user terminal 20, the control unit 12 of the wallet management server 10 increases a balance of electronic money in the electronic wallet based on deposit amount information included in the depositing request. That is, the control unit 12 updates the wallet information stored in the storage unit 13 in accordance with the increase in the balance of electronic money in the electronic wallet.

In addition, when functioning as the settlement processing unit, the control unit 22 performs settlement by the payment method. For example, when scan payment is performed, the control unit 22 transmits a payment request (settlement request) to the wallet management server 10 by reading QR code (registered trademark) displayed in a store with the camera or the like of the first user terminal 20.

Note that, when functioning as the settlement processing unit, the control unit 22 may also perform settlement by the payment method other than a balance of electronic money in the electronic wallet (for example, a bank account or a credit card). For example, when the depositing method registration request is transmitted from the first user terminal 20 to the wallet management server 10, the control unit 22 transmits, to the wallet management server 10, a registration request for registering the payment method included in the depositing method registration request as the settlement method. That is, when registering a certain payment method (for example, a bank account of M bank) as the depositing method in the wallet management server 10, the control unit 22 automatically registers the payment method (bank account of M bank) also as the settlement method. "Registering the payment method as the settlement method" means making it possible to perform settlement by using the payment method as a payment source. That is, it means that scan payment is made possible by using the bank account of the M bank as the payment source. When receiving the registration request from the first user terminal 20, the control unit 12 of the wallet management server 10 stores, as the user information, the payment method included in the registration request in the user information database 131. Thus, the payment method is registered as the settlement method. Then, the control unit 22 transmits, to the wallet management server 10, a payment request for making payment by a bank account or a credit card by using one of the plurality of settlement methods. When receiving the payment request (settlement request) from the first user terminal 20, the control unit 12 of the wallet management server 10 transmits settlement amount information included in the payment request to the settlement provider server 40. Then, settlement processing is performed by information communication between the wallet management server 10 and the settlement provider server 40.

The storage unit 23 stores data of various screens to be displayed by the control unit 22 on the display unit 24. In addition, the storage unit 23 temporarily stores the user information, the wallet information, and the like of the first user, as needed.

The display unit 24 includes a touch panel display, for example, and has an input function for accepting operation by a finger of the first user, a pen, or the like, and a display function for displaying various types of information under control of the control unit 22.

The second user terminal 30 is a computer terminal used by an approver who is a second user. Examples of the second user terminal 30 include a smartphone, a mobile phone, a tablet terminal, a wearable computer, and a personal computer, which are used by the second user. In the first embodiment, the second user terminal 30 corresponds to a second terminal.

The second user terminal 30 includes a communication unit 31, a control unit 32, a storage unit 33, and a display unit 34. The communication unit 31, the control unit 32, the storage unit 33, and the display unit 34 included in the second user terminal 30 are physically similar to the communication unit 21, the control unit 22, the storage unit 33, and the display unit 24 included in the first user terminal 20. The second user terminal 30 may be any terminal as long as it is a mobile terminal capable of transmitting and receiving information to and from the wallet management server 10 via the network NW. In the first embodiment, a processor included in the control unit 32 corresponds to a second processor.

The settlement provider server 40 is a server for managing an account and a credit card of a user, and is provided in financial institutions (for example, banks, credit unions, credit associations, and labor banks) and credit card companies. The settlement provider server 40 includes a communication unit 41, a control unit 42, and a storage unit 43. The communication unit 41, the control unit 42, and the storage unit 43 included in the settlement provider server 40 are physically similar to the communication unit 11, the control unit 12, and the storage unit 13 included in the wallet management server 10.

The storage unit 43 stores account information and credit card information, for each user of the wallet system. Examples of the account information include a name of the user, an account number, an account balance, and a deposit/withdrawal history. Examples of the credit card information include a name of the user, a credit card number, an expiration date of the credit card, use limit amount, and a card use history.

Figure 6:
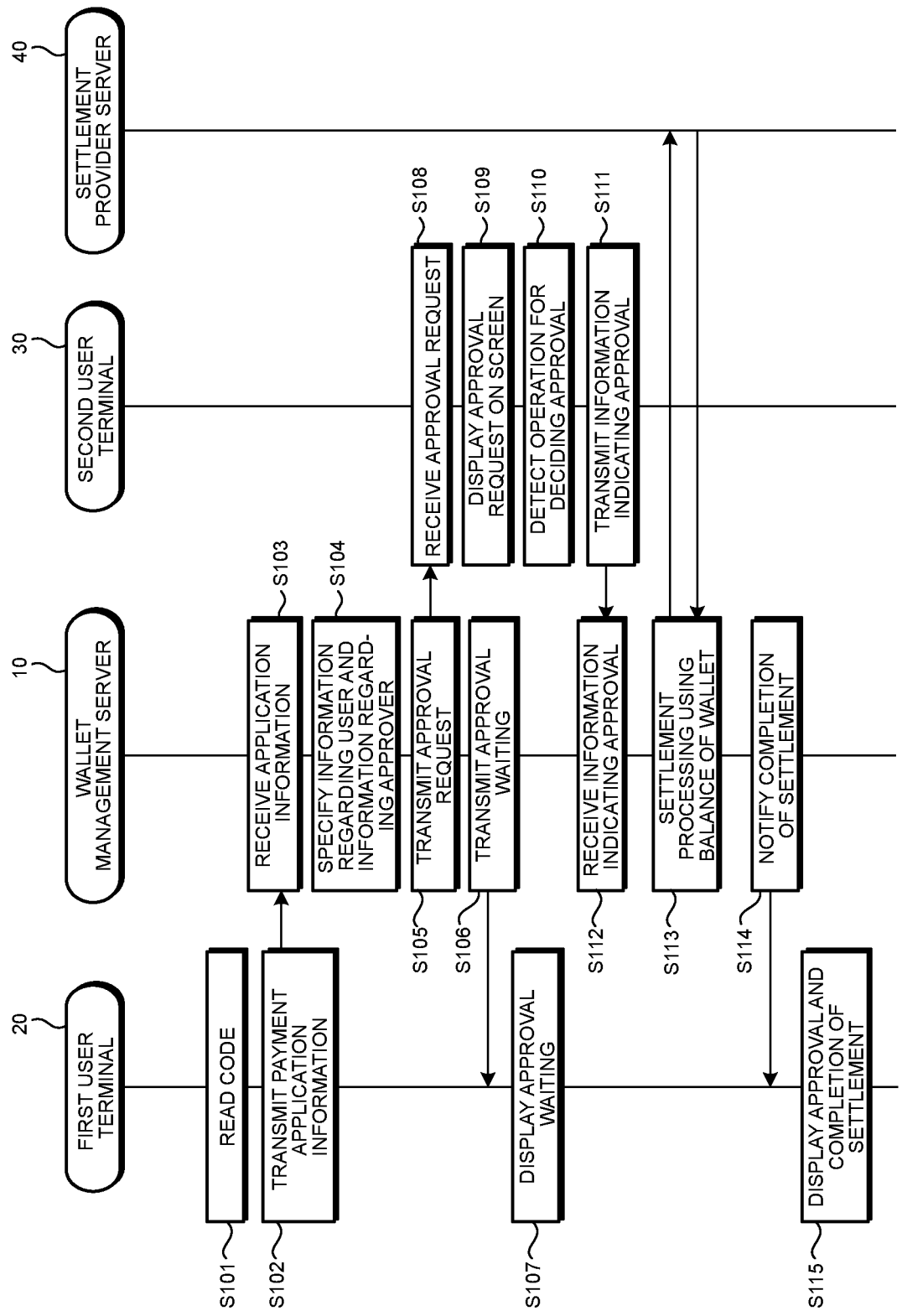
FIG. 6 is a sequence diagram illustrating an approval flow at the time of payment in the first embodiment.

FIG. 6 is a sequence diagram illustrating an approval flow at the time of payment in the first embodiment.

The first user terminal 20 reads a code for electronic settlement displayed in a store (Step S101). In Step S101, in response to operation of the first user terminal 20 by a first user, the code such as QR code (registered trademark) displayed in the store is read by the first user terminal 20. For example, in a case where the first user wants to make payment by using the electronic wallet when purchasing a product in the store, the first user makes a payment request by using the first user terminal 20.

Then, the first user terminal 20 transmits, to the wallet management server 10, information regarding payment processing using electronic money in the electronic wallet (Step S102). In a case where the first user is a restricted person whose use of the electronic wallet is restricted, permission of the payment processing is applied in Step S102. That is, the information regarding payment processing using electronic money, which is transmitted in Step S102, becomes application information for obtaining approval for the payment processing.

The wallet management server 10 receives the application information from the first user terminal 20 (Step S103). In Step S103, the information regarding payment processing using electronic money is received for the electronic wallet associated with the first user. The wallet management server 10 refers to the storage unit 13 based on the received application information, and specifies information regarding the user and information regarding an approver associated with the first user terminal 20 that transmitted the application information (Step S104). In Step S104, the storage unit 13 is referred to and the user is specified based on identification information such as a user ID included in the application information. In addition, in a case where the information regarding the user is associated with the information regarding the approver, the approver is also specified.

The wallet management server 10 transmits, to the second user terminal 30, an approval request for the payment processing using the electronic wallet by the first user (Step S105). In Step S105, based on the information regarding the approver specified in Step S104, the approval request for the payment processing is transmitted to the second user terminal 30 registered as a terminal of the approver.

In addition, after transmitting the approval request to the second user terminal 30, the wallet management server 10 transmits, to the first user terminal 20, information indicating that the payment processing is awaiting approval (Step S106). In Step S106, at the timing when the approval request is transmitted to the second user terminal 30, the information indicating that the payment processing is awaiting approval may be simultaneously transmitted to the first user terminal 20. Then, when receiving the information indicating that the payment processing is awaiting approval, the first user terminal 20 displays the information indicating that the payment processing is awaiting approval on the display unit 24 (Step S107).

The second user terminal 30 receives the approval request from the wallet management server 10 (Step S108). Then, the second user terminal 30 displays information indicating the approval request on the display unit 34 (Step S109). In Step S109, an image capable of accepting screen operation by the approver is displayed on the display unit 34 of the second user terminal 30.

Figure 7:
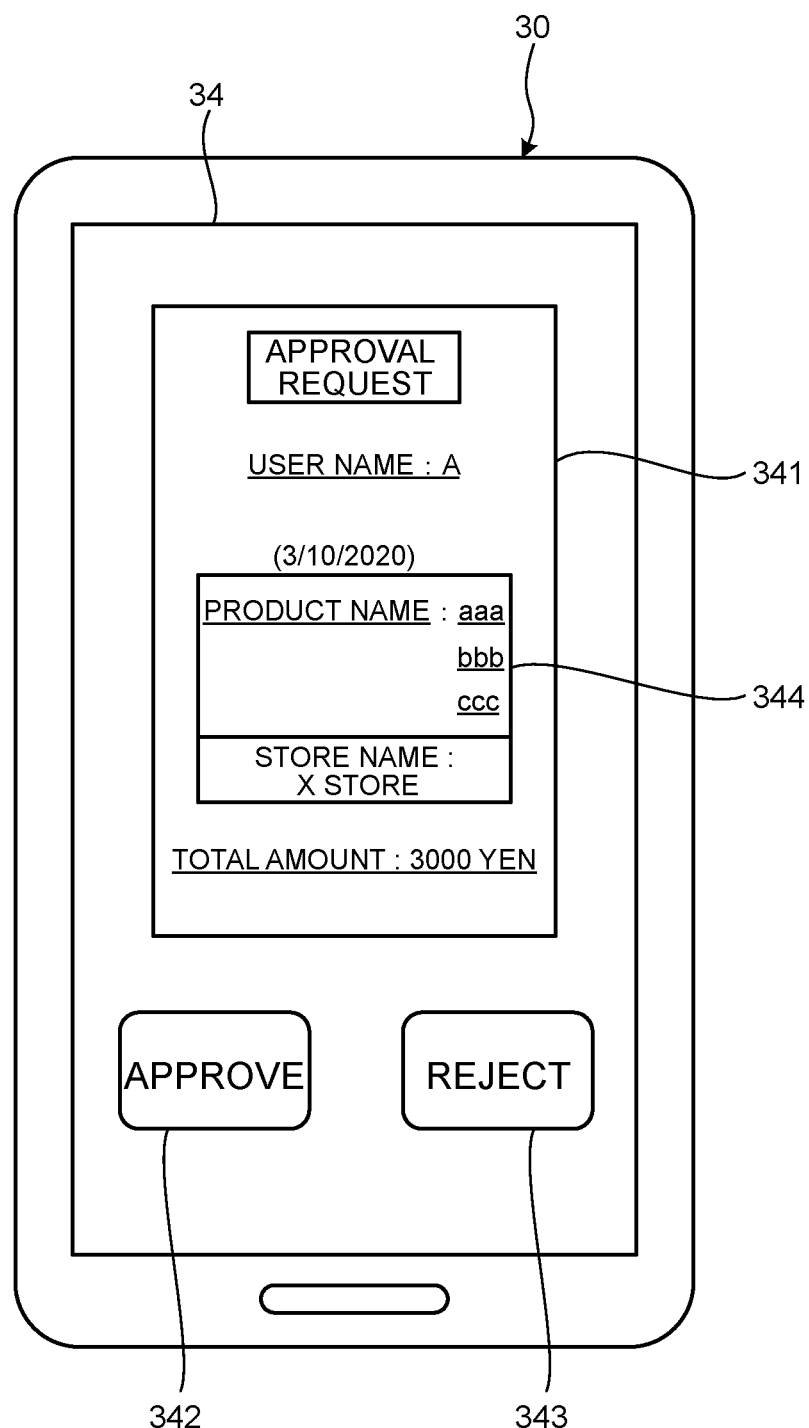
FIG. 7 is a diagram illustrating an example of an approval request screen displayed on a terminal of an approver.

For example, as illustrated in FIG. 7, the display unit 34 of the second user terminal 30 displays, as contents of the approval request, application information 341 indicating a user name, a date, a product name, a store name, and a total amount, an approval button 342, and a rejection button 343. The application information 341 includes detailed information 344 including information such as each product name and store name. The approval button 342 and the rejection button 343 are displayed on the display unit 34 in a state where selection operation by a second user may be accepted.

Then, the second user terminal 30 detects, as operation from the approver, operation of deciding approval for the approval request (Step S110). In Step S110, it is detected by the second user terminal 30 that the approval button 342 illustrated in FIG. 7 is selected by selection operation by the second user. When detecting the operation of selecting the approval button 342, the control unit 32 of the second user terminal 30 determines that the operation of deciding approval for the approval request is detected.

When detecting the operation of deciding approval for the approval request, the second user terminal 30 transmits, to the wallet management server 10, information indicating approval for the approval request (Step S111). In Step S111, information indicating that the payment processing is permitted for the approval request is transmitted from the second user terminal 30 to the wallet management server 10.

The wallet management server 10 receives the information indicating approval from the second user terminal 30 (Step S112). Then, the wallet management server 10 performs settlement processing using a balance of the electronic wallet associated with the user (Step S113). In Step S113, the settlement processing is performed by transmitting and receiving information between the wallet management server 10 and the settlement provider server 40.

Then, when the settlement processing with the settlement provider server 40 is completed, the wallet management server 10 transmits information indicating that the settlement is completed (settlement completion notification) to the first user terminal 20 (Step S114).

When receiving the settlement completion notification from the wallet management server 10, the first user terminal 20 displays, as an image on the display unit 24, the information indicating that approval for the payment processing is decided together with the information indicating that the settlement using the electronic wallet is completed (Step S115).

In addition, for the approval request displayed in Step S109, the rejection button 343 illustrated in FIG. 7 may be selected by selection operation by the second user. In this case, the second user terminal 30 detects, as operation from the approver, operation of deciding rejection for the approval request. At this time, the second user terminal 30 transmits, to the wallet management server 10, information indicating rejection for the approval request. When receiving the information indicating rejection from the second user terminal 30, the wallet management server 10 stops the payment processing. Then, the information indicating that the application for the payment processing is rejected is transmitted from the wallet management server 10 to the first user terminal 20.

As described above, according to the first embodiment, even a user whose use of electronic money is restricted may make payment using electronic money. That is, even if a first user is a restricted person whose use of the electronic wallet is restricted, the first user may make payment using the electronic wallet by receiving approval from an approver in real time. In addition, the approver may monitor use of electronic money in the electronic wallet of the user in real time.

Figure 8:
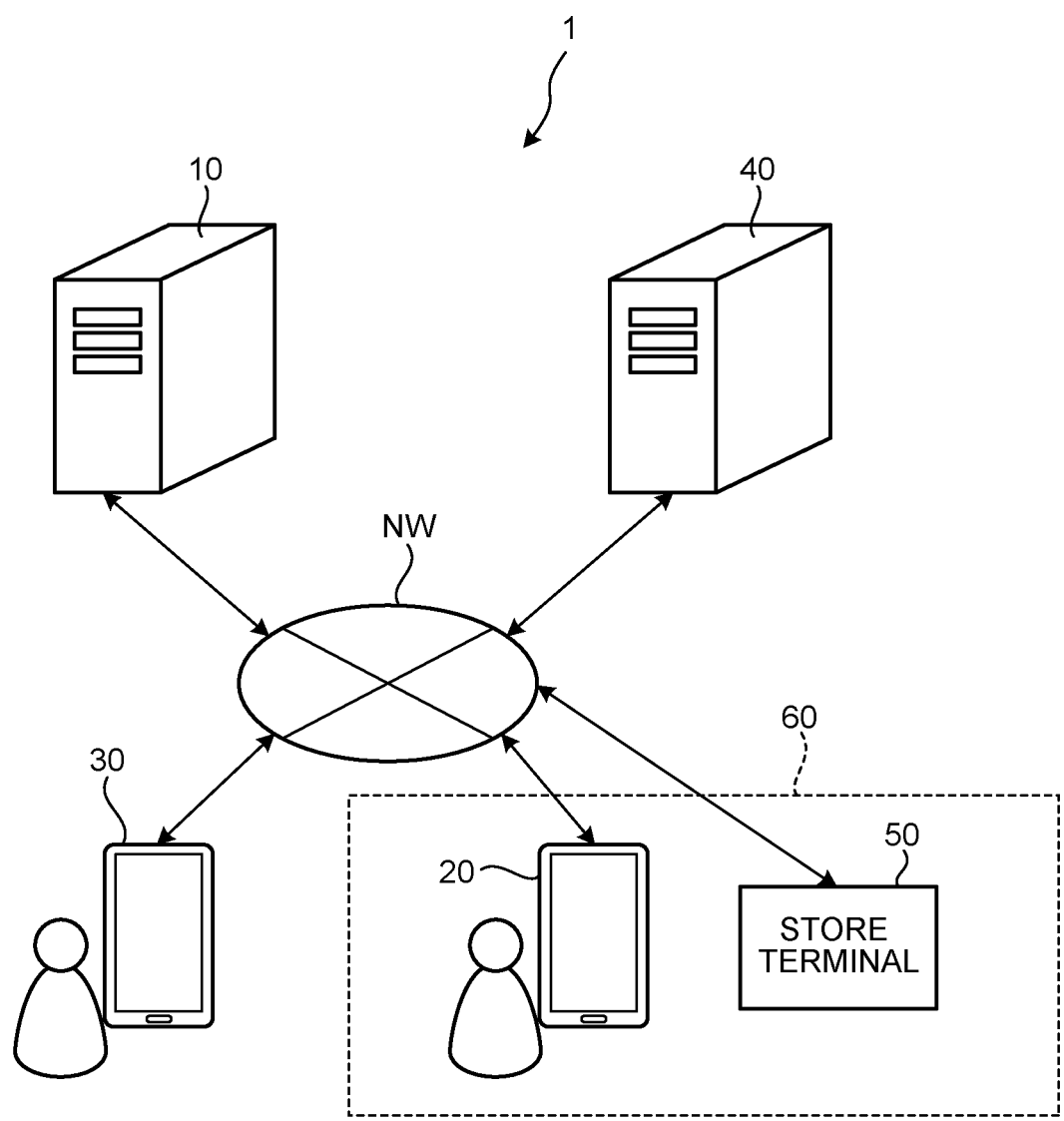
FIG. 8 is a schematic diagram illustrating a schematic configuration of an information processing system in a second embodiment.

Next, a second embodiment will be described with reference to FIGS. 8 to 10. In the second embodiment, as illustrated in FIG. 8, an information processing system 1 includes a store terminal 50. Note that, in the description of the second embodiment, the description of configurations similar to those of the first embodiment will be omitted, and the reference numerals thereof will be cited.

As illustrated in FIG. 8, in the information processing system 1 of the second embodiment, a wallet management server 10, a first user terminal 20, a second user terminal 30, a settlement provider server 40, and the store terminal 50 may communicate with each other through a network NW. By the first user terminal 20 brought into a store 60, an application for payment processing using an electronic wallet is made. In the second embodiment, the store terminal 50 corresponds to the first terminal, the second user terminal 30 corresponds to the second terminal, and the first user terminal 20 corresponds to a third terminal.

Figure 9:
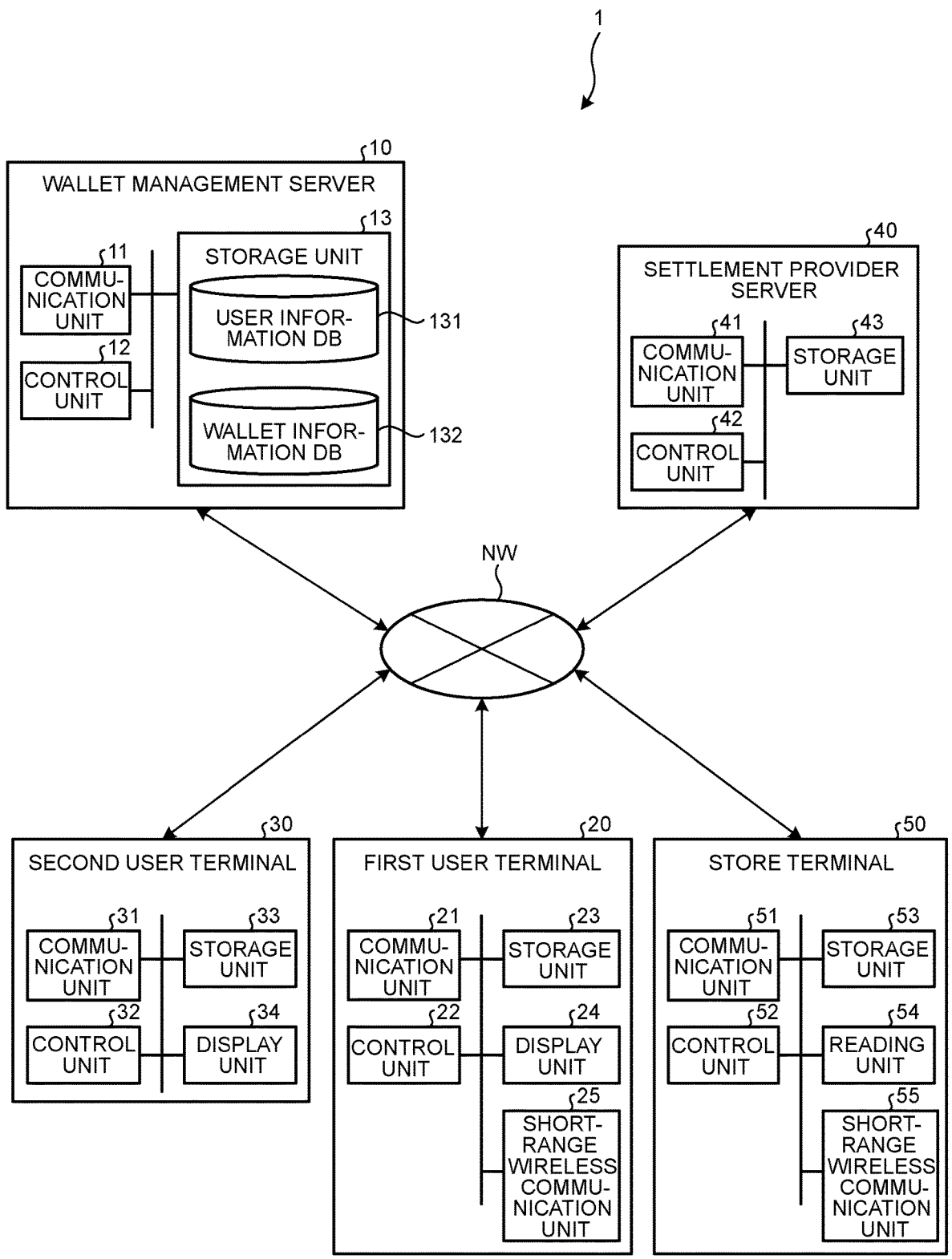
FIG. 9 is a block diagram illustrating functional blocks of the information processing system in the second embodiment.

As illustrated in FIG. 9, the first user terminal 20 includes a communication unit 21, a control unit 22, a storage unit 23, a display unit 24, and a short-range wireless communication unit 25.

The control unit 22 transmits, to the store terminal 50, a settlement request for performing settlement by electronic money deposited into the electronic wallet by using one of a plurality of settlement methods (electronic money payment, scan payment, and code payment) set in advance. Examples of the settlement method include scan payment, electronic money payment, and code payment. The scan payment, the electronic money payment, and the code payment are all settlement methods using a balance of electronic money in the electronic wallet. For example, when the electronic money payment is performed, the control unit 22 transmits a payment request to the store terminal 50 through the short-range wireless communication unit 25. In addition, when the code payment is performed, the control unit 22 transmits a payment request to the store terminal 50 by causing a reading unit 54 such as a code reader of the store terminal 50 to read a barcode or QR code (registered trademark) displayed on the first user terminal 20. In the second embodiment, a processor included in the control unit 22 corresponds to the third processor.

The short-range wireless communication unit 25 has a communication function conforming to a standard such as near field radio communication (NFC), Bluetooth (registered trademark) low energy (BLE), or Infrared Data Association (IrDA), for example. For example, when performing the electronic money payment, the first user terminal 20 performs short-range wireless communication with the store terminal 50 through the short-range wireless communication unit 25.

The store terminal 50 includes a cash register terminal provided in the store 60 where a wallet system may be used. The store terminal 50 includes a communication unit 51, a control unit 52, a storage unit 53, the reading unit 54, and a short-range wireless communication unit 55. The communication unit 51, the control unit 52, the storage unit 53, and the short-range wireless communication unit 55 are physically similar to the communication unit 11, the control unit 12, the storage unit 13, and the short-range wireless communication unit 25. In the second embodiment, a processor included in the control unit 52 corresponds to the first processor.

The reading unit 54 includes a barcode reader provided in the cash register terminal. The code payment is settlement performed by reading a barcode or QR code (registered trademark) displayed on the first user terminal 20 with the reading unit 54 of the store terminal 50.

In addition, the electronic money payment is settlement performed in a contactless manner between the short-range wireless communication unit 25 of the first user terminal 20 and the short-range wireless communication unit 55 of the store terminal 50 by holding the first user terminal 20 brought into the store 60 over the store terminal 50.

Subsequently, the control unit 52 of the store terminal 50 transmits a payment request to the wallet management server 10 via the network NW. When receiving the payment request from the store terminal 50, the control unit 12 of the wallet management server 10 executes various types of processing based on information included in the payment request from the store terminal 50.

Figure 10:
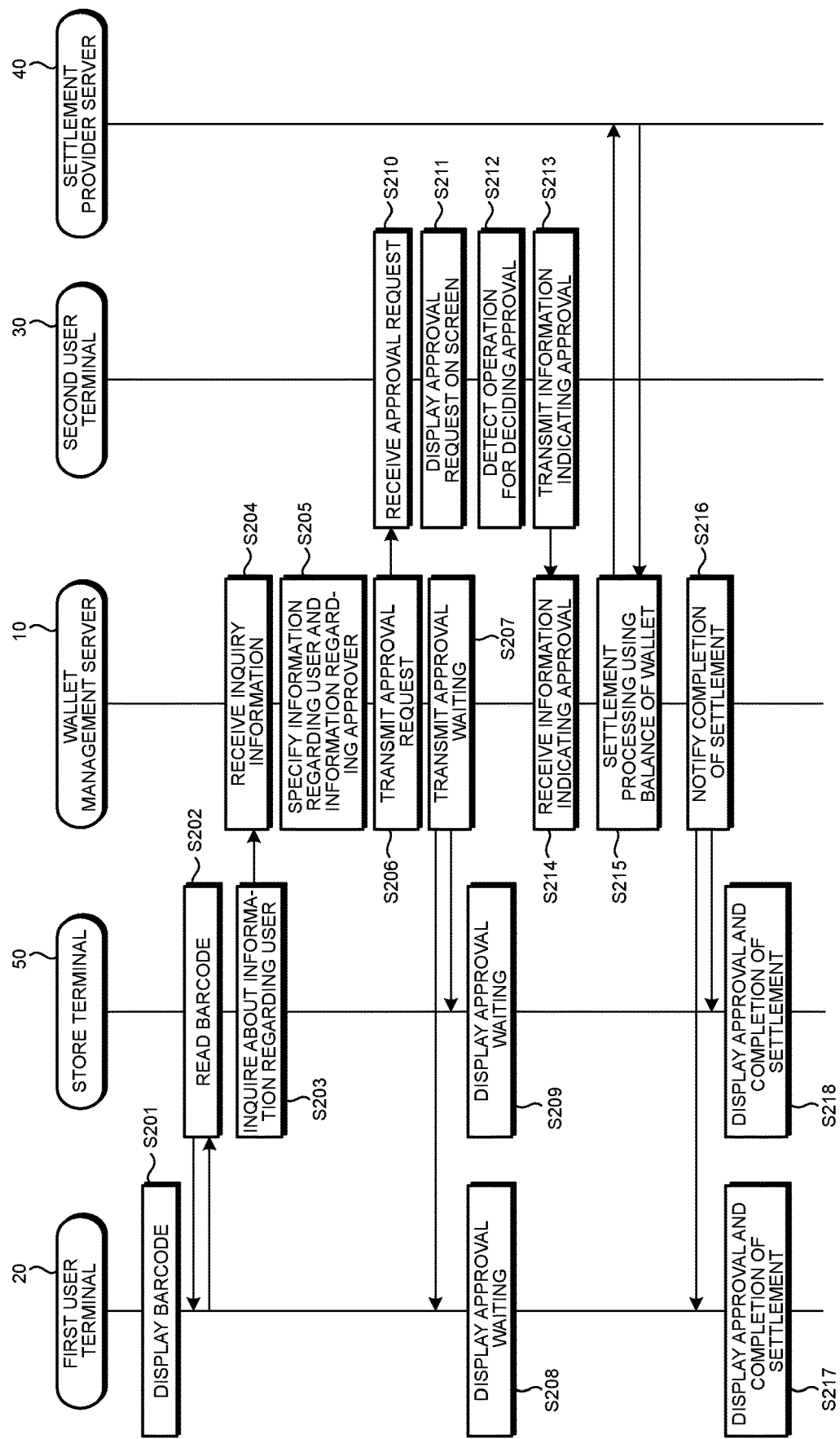
FIG. 10 is a sequence diagram illustrating an approval flow at the time of payment in the second embodiment.

FIG. 10 is a sequence diagram illustrating an approval flow at the time of payment in the second embodiment.

The first user terminal 20 displays a barcode for performing code payment on the display unit 24 (Step S201). The first user terminal 20 displays the barcode on the display unit 24 by detecting operation by a first user.

The store terminal 50 reads the barcode displayed on the display unit 24 of the first user terminal 20 (Step S202). In Step S202, the store terminal 50 acquires information of the first user terminal 20 by reading the barcode by the reading unit 54. The information read in Step S202 includes information regarding the electronic wallet associated with the first user. Note that, in Steps S201 and S202, not only the barcode but also QR code (registered trademark) may be used.

Based on the information acquired from the first user terminal 20, the store terminal 50 inquires of the wallet management server 10 about information regarding the first user who uses the electronic wallet (Step S203). In Step S203, the information regarding a user whose use of the electronic wallet is restricted is inquired. In addition, in Step S203, it is not necessary to determine whether or not the first user is a user whose use of the electronic wallet is restricted in the store terminal 50.

The wallet management server 10 receives, from the store terminal 50, the inquiry information regarding use of the electronic wallet by the first user (Step S204).

In addition, based on the received inquiry information, the wallet management server 10 specifies information regarding the user and information regarding an approver (Step S205). In Step S205, based on identification information such as a user ID included in the inquiry information, the storage unit 13 is referred to and corresponding information regarding the user and information regarding the approver are specified.

The wallet management server 10 transmits, to the second user terminal 30, an approval request for payment processing using the electronic wallet by the first user (Step S206). Step S206 is similar to Step S105.

In addition, the wallet management server 10 transmits, to the first user terminal 20 and the store terminal 50, information indicating that the payment processing is awaiting approval (Step S207). In Step S207, at the timing when the approval request is transmitted to the second user terminal 30, the information indicating that the payment processing is awaiting approval may be simultaneously transmitted to the first user terminal 20 and the store terminal 50. When receiving the information indicating that the payment processing is awaiting approval, the first user terminal 20 displays the information indicating that the payment processing is awaiting approval on the display unit 24 (Step S208). When receiving the information indicating that the payment processing is awaiting approval, the store terminal 50 displays the information indicating that the payment processing is awaiting approval on the display unit (Step S209).

Steps S210 to S215 illustrated in FIG. 10 are similar to Steps S108 to S113 illustrated in FIG. 6.

As illustrated in FIG. 10, when the settlement processing with the settlement provider server 40 is completed, the wallet management server 10 transmits information indicating that the settlement is completed (settlement completion notification) to the first user terminal 20 and the store terminal 50 (Step S216).

When receiving the settlement completion notification from the wallet management server 10, the first user terminal 20 displays, as an image on the display unit 24, the information indicating that approval for the payment processing is decided and the information indicating that the settlement using the electronic wallet is completed (Step S217). When receiving the settlement completion notification from the wallet management server 10, the store terminal 50 displays the information indicating approval and the settlement completion as an image on the display unit (Step S218).

In addition, in the second embodiment, for the approval request displayed in Step S211, the rejection button 343 illustrated in FIG. 7 may be selected by selection operation by the second user. In this case, the information indicating that the payment processing is rejected is transmitted from the wallet management server 10 to the first user terminal 20 and the store terminal 50.

As described above, according to the second embodiment, even a user whose use of electronic money is restricted may make payment using electronic money. That is, even if a first user is a restricted person whose use of the electronic wallet is restricted, the first user may make payment using the electronic wallet by receiving approval from an approver in real time. In addition, the approver may monitor use of electronic money in the electronic wallet of the user in real time.

According to the present disclosure, even a user whose use of electronic money is restricted may make payment using electronic money.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   a first terminal comprising a first display, a first short-range communication unit, and a first processor comprising hardware;
   a second terminal comprising a second display and a second processor comprising hardware;
   a server comprising
   a third processor comprising hardware, and
   a storage device that stores information regarding a first user that is associated with the first terminal and is designated as a requester, and information regarding a second user that is associated with the second terminal and is designated as an approver for payments to be made by the first user, and a store terminal comprising a second short-range communication unit, a third display, a reading unit, and a fourth processor comprising hardware, wherein the fourth processor of the store terminal is configured to initiate a payment processing of a transaction by performing communication between the first short-range communication unit of the first terminal and the second short-range communication unit, and transmit inquiry information regarding the payment processing of the transaction to the server in response to detecting, via the reading unit, payment information of a payment request from the first terminal, wherein the detected payment information is a barcode or quick response (OR) code, wherein the first processor is configured to transmit, to the store terminal, the payment information for the payment processing of the transaction using electronic money deposited into an electronic wallet of the first user, wherein the third processor of the server is configured to specify the first user and the second user in response to receiving the inquiry information from the store terminal, transmit, in response to receiving the inquiry information, an approval request for the payment processing of the transaction to the second terminal associated with the second user, and complete the payment processing of the transaction in response to receiving authorization information indicating an approval of the approval request from the second terminal, in response to receiving information indicating that the approval request is awaiting approval, the first processor is further configured to control the first display to display information indicating that the payment processing is awaiting approval, and the fourth processor of the store terminal is further configured to control the third display to display the information indicating that the payment processing is awaiting approval, in response to receiving the approval request from the server, the second processor is configured to:

control the second display to display a name of a product associated with the approval request, a name of a store associated with the approval request, a price of the product, an approval button configured to authorize the payment processing, and a rejection button configured to reject the payment processing, and transmit, in response to receiving the authorization information indicating the approval being input via the approval button or the rejection button, the authorization information for the approval request to the server;

in response to receiving information indicating that the approval request is authorized and the payment processing of the transaction is completed from the server, the first processor is further configured to control the first display to display the information indicating that the approval request is authorized and that the payment processing is completed, and the fourth processor of the store terminal further configured to control the third display to display the information indicating that the approval request is authorized and that the payment processing is completed.

2. The information processing system according to claim 1, wherein the first processor is further configured to transmit the information regarding the payment processing to the server based on operation of the first terminal by the first user.

3. The information processing system according to claim 1, wherein the third processor is further configured to refer to the storage device for the specified first user and the specified second user based on the inquiry information from the store terminal.

4. The information processing system according to claim 1, wherein a plurality of approvers are registered in the storage device as approvers for the user, and the system further comprises a first approver terminal used by a first approver of the plurality of approvers, and a second approver terminal used by a second approver of the plurality of approvers.

5. The information processing system according to claim 4, wherein the third processor is configured to transmit the approval request to the first approver terminal and the second approver terminal, and perform the payment processing when receiving information indicating approval for the approval request from at least one of the first approver terminal and the second approver terminal.

6. The information processing system according to claim 1, wherein the second processor is configured to determine that the approval for the approval request is detected in response to an operation of a selection of the approval button.

7. The information processing system according to claim 1, wherein the second processor is configured to transmit, to the server, information indicating a rejection of the payment processing for the approval request in response to an operation of a selection of the rejection button, and the third processor is configured to stop the payment processing in response to receiving information indicating the rejection of the payment processing for the approval request from the second terminal.

\* \* \* \* \*